United States Patent [19]

Nebelung

[11] Patent Number: 4,793,848
[45] Date of Patent: Dec. 27, 1988

[54] GLASSWARE FORMING MACHINE AND APPARATUS INCORPORATING SUCH A MACHINE

[75] Inventor: Hermann H. Nebelung, Winsen/Luhe, Fed. Rep. of Germany

[73] Assignee: Emhart Industries, Inc., Farmington, Conn.

[21] Appl. No.: 94,343

[22] Filed: Sep. 4, 1987

[30] Foreign Application Priority Data

Sep. 16, 1986 [GB] United Kingdom ............... 8622290

[51] Int. Cl.⁴ .................................................. C03B 7/14
[52] U.S. Cl. ........................................ 65/225; 65/260; 65/304; 65/325; 65/207
[58] Field of Search ............... 65/260, 305, 304, 325, 65/225, 207

[56] References Cited

FOREIGN PATENT DOCUMENTS

| 404238 | 1/1934 | United Kingdom . |
| 421563 | 12/1934 | United Kingdom . |
| 444637 | 3/1936 | United Kingdom . |
| 492622 | 9/1938 | United Kingdom . |

Primary Examiner—Arthur Kellogg
Attorney, Agent, or Firm—Spencer T. Smith

[57] ABSTRACT

A glassware forming machine (10) of the individual section type has its sections (12) arranged along an arc of a circle. Apparatus incorporating such a machine has the sections arranged along an arc centered on a point below the median position (39) of the or all the orifices of a feeder of the apparatus which supplied gobs of molten glass to the machine (10).

5 Claims, 2 Drawing Sheets

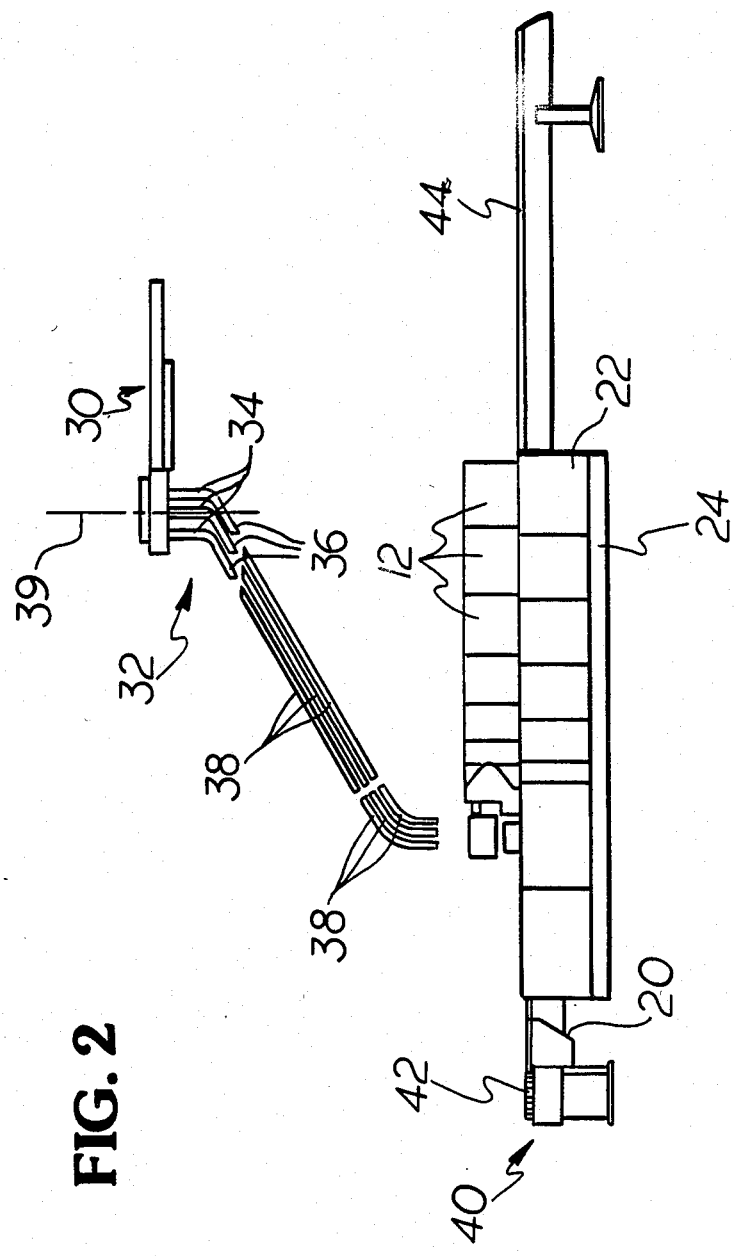

GLASSWARE FORMING MACHINE AND APPARATUS INCORPORATING SUCH A MACHINE

BACKGROUND OF THE INVENTION

This invention is concerned with glassware forming machines of the individual section type and with apparatus incorporating such a machine for use in the manufacture of glassware articles.

A glassware forming machine of the individual section type comprises a plurality of independent glass manufacturing units, called "sections", each of which operates to manufacture gobs of molten glass into articles of glassware. Each section has a parison-moulding station at which gobs of molten glass received by the section are moulded into parisons and a further moulding station at which the parisons moulded at the parison-moulding station are formed into completed articles of glassware. The sections of a conventional glassware forming machine of the individual section type are arranged to receive gobs in turn and to operate with phase differences between the sections so that at any given moment each section is at a different stage of its operation. A gob distributor distributes gobs to the sections in turn in a predetermined sequence and a conveyor carries away the completed articles from all the sections. The sections are mounted side by side on a linear bed and the conveyor extends parallel to the bed along the row of sections. Thus, conventional apparatus for use in the manufacture of glassware articles comprises a feeder arranged to produce gobs of molten glass from a stream of molten glass supplied thereto through a forehearth leading out of a furnace in which the glass is melted. The gobs fall from one or more orifices of the feeder, the feeder having one orifice when the sections are to operate on one gob at a time (the so-called "single gob" mode) and two orifices when the sections are to operate on two gobs simultaneously (the so-called "double gob" mode). It is also possible to have three or four orifices. Gobs falling from the orifices fall into the gob distributor which is arranged to distribute the gobs falling from the feeder to the sections of a glassware forming machine of the individual section type of the apparatus. The gob distributor is positioned above the centre of the row of sections and is arranged to deliver successive gobs from a particular feeder orifice to the sections of the machine in a predetermined sequence. Thus, the gobs are formed into articles of glassware by the sections which comprise mechanisms operable to form one or more gobs at a time into articles of glassware.

In a conventional apparatus as described above, the gob distributor is arranged to deliver the gobs to a series of guides which lead to blank moulds, or parisonmoulding moulds, of the sections of the machine so that a gob is guided into the mould. Because these sections are arranged in a row, the length of these guides is unequal, the guides to sections in the middle of the row and hence closer to the gob distributor being considerably shorter than those to sections at the ends of the row of sections. The inequality in the lengths of the guides increases with the number of sections so that the variation of lengths is greater for a ten section machine, for example, than it is for a six section machine. Because of the unequal lengths of the guides, gobs take unequal times to reach their respective sections which means that the gobs do not all arrive in their sections at exactly the same temperature. This has an adverse effect on the forming operation of the machine since the machine operates with all the sections operating identically so that variations in gob temperature show up as variations in the quality of the articles of glassware produced. Furthermore, the unequal lengths of guides cause the glass works to need to stock a considerable quantity of different types of spare guides to enable worn guides to be replaced when necessary.

It is an object of the present invention to provide an apparatus of the type described in which the length of the guides from the gob distributor to each section is equal and a machine which is suitable for use in such an apparatus.

BRIEF DESCRIPTION OF THE INVENTION

The invention provides a glassware forming machine of the invention section type wherein the sections are arranged along an arc of a circle.

In a machine as described in the last preceding paragraph, the machine can be arranged so that the gob distributor is above the centre of the circle so that each section is equi-distant from the gob distributor. Thus, the delivery guides for the gobs can be made equal in length and the time required for each gob to arrive at its respective section is constant. Furthermore, the various guides are of identical construction so that the spare parts are interchangeable between various sections.

Preferably, each section of the machine comprises a supporting frame which, in plan view, has the shape of a trapezium with two opposite sides extending radially of the circle and the supporting frames of all the sections are mounted on an arcuate base. In this way, the sections can nest together in an efficient manner.

The invention also provides apparatus for use in the manufacture of glassware articles comprising a feeder arranged to produce gobs of molten glass from a stream of molten glass supplied thereto, the gobs falling from one or more orifices of the feeder, and a gob distributor arranged to distribute gobs falling from the feeder to the sections of a glassware forming machine of the individual section type of the apparatus, the gob distributor being arranged to deliver successive gobs from a feeder orifice to the sections of the machine in a predetermined sequence, each section of the machine comprising mechanisms operable to form one or more gobs at a time into articles of glassware, wherein the sections of the machine are arranged along an arc of a circle centred on a point below the median position of the or all the orifices of the feeder.

With the arc centred on a point below the median position of the or all the orifices of the feeder, the guides for all the gobs can be substantially of the same length. Very minor adjustment may be necessary to the lengths of some of the guides where more than one gob is delivered at a time. The median position of the orifices is, in the case of one orifice, at the centre of the orifice, in the case of two orifices, halfway between the two orifice centres, in the case of three orifices in a line, at the centre of the centre orifice, and, in the case of four orifices in a line, halfway between the centres of the two middle orifices.

Preferably, in an apparatus according to the last preceding paragraph but one, each section of the machine comprises a supporting frame on which said mechanisms are mounted, the supporting frame having, in plan view, the shape of a trapezium which has two of its sides extending radially of said point. Thus, the supporting frame has the shape of a trapezium as described above and these sections nest efficiently. Preferably these sections of the machine are mounted on a base which is arcuate about said point.

Each section of the glassware forming machine comprises an equal number of parison-moulding moulds as there are feeder orifices, each mould being arranged to shape a gob into a parison, and two finish moulds associated with each parison-moulding mould in which parisons formed in the parison-moulding mould are formed into articles of glassware, each finish mould receiving alternate parisons shaped in the associated parison forming mould, the two finish moulds being mounted on diametrically-opposed portions of a turntable which is arranged to carry the finish moulds between a loading position in which they receive parisons and an unloading position in which completed articles can be removed from the mould. Thus, the machine has the form of a so-called "RIS machine" having its finish moulds on a turntable. The sections have their turntable at their wider end which makes the turntable easier to accommodate within a section.

Preferably, the apparatus also comprises a conveyor arranged to carry completed articles of glassware away from the machine, the conveyor having a portion which is arcuate about said point. Thus, although the sections are arranged in an arc, the conveyor can conform to this arc and maintain a constant distance from the sections. A suitable conveyor can be obtained from FMC Corporation, Chain Division, Indianapolis, Ind., U.S.A.

Preferably, the apparatus also comprises a manipulator operable to remove and replace mould parts of the sections, the manipulator being mounted for arcuate movement about said median position. Thus, the task of removing and replacing mould parts can be assisted by the use of a simply-mounted manipulator.

BRIEF DESCRIPTION OF THE DRAWINGS

There now follows a detailed description, to be read with reference to the accompanying drawings of a glassware forming machine which is illustrative of the invention and an illustrative apparatus incorporating such a machine for use in the manufacture of glassware articles. It is to be understood that the illustrative machine and apparatus have been selected for description by way of example and not of limitation of the invention.

In the drawings:

FIG. 2 is a cross-sectional view taken on the line II—II in FIG. 1.

DETAILED DESCRIPTION OF PREFERRED EMBODIMENT OF THE INVENTION

Figure 1:
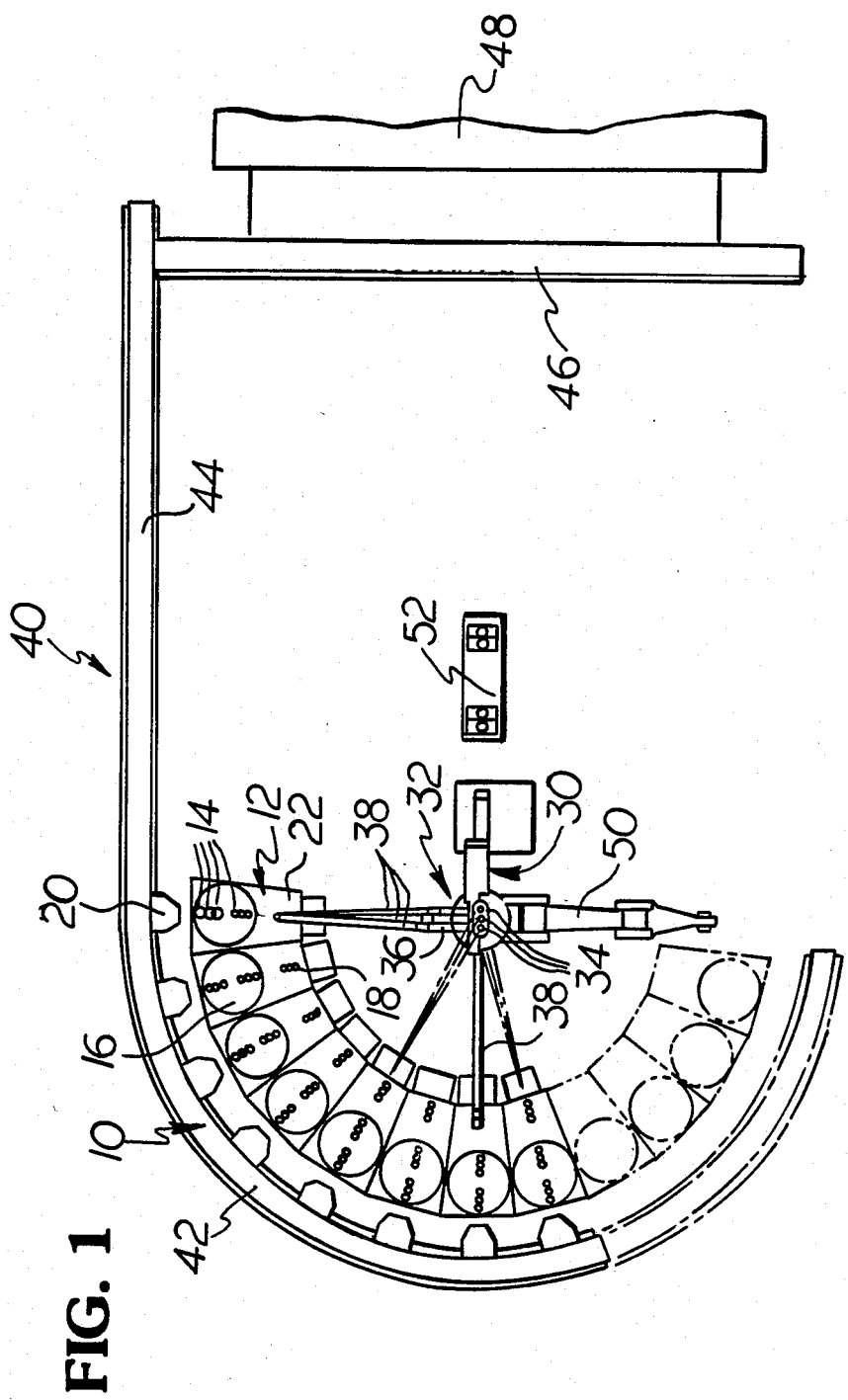
FIG. 1 is a diagrammatic plan view of the illustrative apparatus.

The illustrative glassware forming machine 10 is of the individual section type having eight sections 12 (positions for four further sections are shown in broken line in FIG. 1). The machine 10 is of the R.I.S. machine type in which its finish moulds 14 are mounted on a turntable 16.

Each section 12 of the machine 10 has one or more blank moulds 18 (three are shown in FIG. 1). These blank moulds 18 and associated mechanisms (not shown) are arranged to operate in a well-known manner to form gobs of molten glass into parisons. When a parison has been formed in each blank mould 18, each parison is transferred by an invert mechanism (not shown) of conventional construction to one of two finish moulds 14 mounted on the turntable 16. Thus, FIG. 1 shows three blank moulds 18 and six finish moulds 14 in each section 12 so that two finish moulds are associated with each blank mould.

Parisons are transferred to finish moulds 14 when the turntable 16 has positioned the finish moulds at their closest to the blank moulds 18. The turntable 16 is then turned through 180° to bring the moulds 14 containing parisons opposite a deadplate 20 of the section 12. Meanwhile, the other moulds 14 on the turntable are moved into position to receive parisons. During the movement, the moulds 14 and associated mechanisms (not shown) are arranged to operate in a well-known manner to form the parisons into completed articles of glassware.

Each section 12 also comprises a take-out mechanism (not shown) of conventional construction operable to remove the completed articles of glassware from the finish moulds 14 and position them on the deadplate 20 of the section.

Each section 12 of the machine 10 also comprises a supporting frame 22 on which the above-mentioned moulds 14 and 18, the mechanisms associated with the moulds, and the turntable 16 are mounted. Thus, the frame 22 supports mechanisms operable to form one or more gobs at a time into articles of glassware which are positioned on the deadplate 20. The supporting frame 22, when viewed in plan (see FIG. 1), has the shape of a trapezium with two opposite sides extending radially of a circle centred on a median position (to be described). The frames 22 of adjacent sections 12 have these radial sides abutting one another so that the sections "nest" together (see FIG. 1) and are arranged along an arc of a circle about said median position. The frames 22 of all the sections 12 are mounted on a base 24 which is arcuate about said median position.

The illustrative apparatus is for use in the manufacture of glassware articles and comprises in addition to the machine 10, a feeder (not shown but of conventional construction) arranged to produce gobs of molten glass from a stream of molten glass supplied thereto. The gobs fall from three orifices of the feeder.

The illustrative apparatus also comprises a gob distributor 30 arranged to distribute gobs falling from the feeder to the sections 12 of the machine 10. The distributor is arranged to deliver successive gobs from a feeder orifice to the sections 12 in a predetermined sequence. The gob distributor 30 is of conventional construction and has three scoops 32 arranged in a straight line. Each scoop 32 has, in conventional manner, a vertically-extending tubular upper portion 34 aligned with one of the feeder orifices so that gobs falling from the orifices fall into the portions 34, and a lower portion 36 of trough-like construction which bends in a vertical plane and is arranged, as the scoops 32 are turned about a vertical axis to guide each gob into one of a number of guides 38. Each guide 38 leads to one of the blank moulds 18. There are, thus, 24 such guides 38, three associated with each section 12 (only some of the guides 38 are shown in the drawings).

The gob distributor 30 is positioned above the centre of the arc along which the sections 12 are arranged. The arc is centred about the median position 39 (see FIG. 2) of the feeder orifices which in the case of three orifices is the centre of the central orifice (this corresponds to the centre of the upper portion 34 of the central scoop 32). The gob distributor operates to turn its scoops 32 to face the guides 38 of each section 12 in turn in a predetermined sequence so that the blank moulds 18 are periodically charged with gobs. As the distance from the gob distributor 30 to each section 12 is equal, the gobs arrive at the blank moulds 18 of each section at substantially the same temperature. Furthermore, the guides 38 of each section are interchangeable.

The illustrative apparatus also comprises a conveyor 40 which operates to carry completed articles of glassware away from the machine 10. The conveyor 40 has an arcuate portion 42 which is arcuate about the aforementioned median position and passes the deadplates 20 of all the sections 12 of the machine. In the operation of the apparatus, push-out mechanisms of the apparatus (not shown but of conventional construction) remove articles from the deadplates 20 and position them on the conveyor portion 42. The articles are carried along the portion 42 to a linear portion 44 of the conveyor 40 from whence they are transferred (in conventional manner) to a cross conveyor 46 and from thence to an annealing lehr 48.

The illustrative apparatus also comprises a manipulator 50 operable to remove and replace mould parts from the sections 12. The manipulator 50 is mounted below the scoops 32 for arcuate movement about said median position. The manipulator 50 can, thus, readily be turned to operate at any of the sections and can also receive parts from deliver parts to a hoist 52. The manipulator 50 can be used to lift moulds 14 or 18 or associated mechanisms away from the sections 12 and to bring replacement parts thereto.

I claim:

1. Apparatus for use in the manufacture of glassware articles formed from gobs of molten glass sheared from a runner or runners of molten glass falling from a corresponding number of orifices of a feeder comprising
   a plurality of machine sections each including means for forming gobs into glassware,
   means for supporting said plurality of machine sections along an arc of a circle,
   gob distributor means for distributing gobs sheared from the runners sequentially to said plurality of machine sections,
   the center of said circle corresponding to the median position of the runners of molten glass, and
   conveyor means including a portion adjacent to said plurality of machine sections for carrying completed articles of glassware away from said plurality of machine sections, said adjacent portion being concentric to said circle.

2. A glassware forming machine according to claim 1 wherein each section of the machine comprises a supporting frame which, in plan view, has the shape of a trapezium with two opposite sides extending radially of the circle and the supporting frames of all the sections are mounted on an arcuate base.

3. Apparatus according to claim 1, wherein said forming means comprises an equal number of parison-moulding moulds as there are runners, each mould being arranged to shape a gob into a parison, and two finish moulds associated with each parison-moulding mould in which parisons formed in the parison-moulding mould are formed into articles of glassware, each finish mould receiving alternate parisons shaped in the associated parison-forming mould, turntable means and means for mounting said two finish moulds on diametrically-opposed portions of said turntable means which is arranged to carry the finish moulds between a loading position in which they receive parisons and an unloading position in which completed articles can be removed from the mould.

4. Apparatus according to claim 1, wherein said conveyor means is located radially outwardly from said machine sections.

5. Apparatus for use in the manufacture of glassware articles formed from gobs of molten glass sheared from a runner or runners of molten glass falling from a corresponding number of orifices of a feeder comprising
   a plurality of machine sections each including mould means for forming gobs into glassware,
   means for supporting said plurality of machine sections along an arc of a circle,
   gob distributor means for distributing gobs sheared from the runners sequentially to said plurality of machine sections,
   the center of said circle corresponding to the median position of the runners of molten glass,
   a plurality of replacement mould means,
   means for supporting replacement mould means proximate each of said machine section mould means,
   manipulator means for removing the mould means of any of said machine sections and replacing said removed mould means with the replacement mould means proximate thereto, and
   means for mounting said manipulator means for arcuate movement about said center point of said circle.

* * * * *